UNITED STATES PATENT OFFICE.

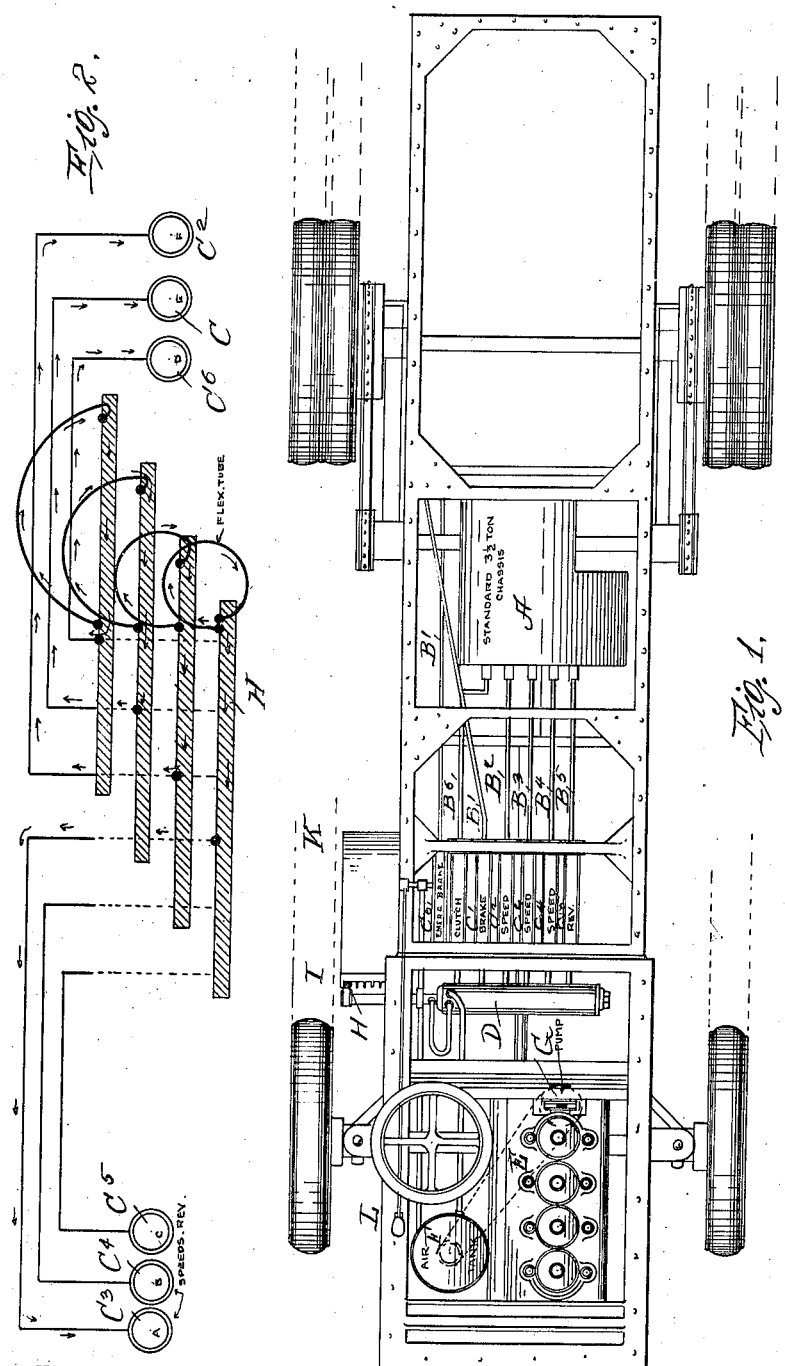

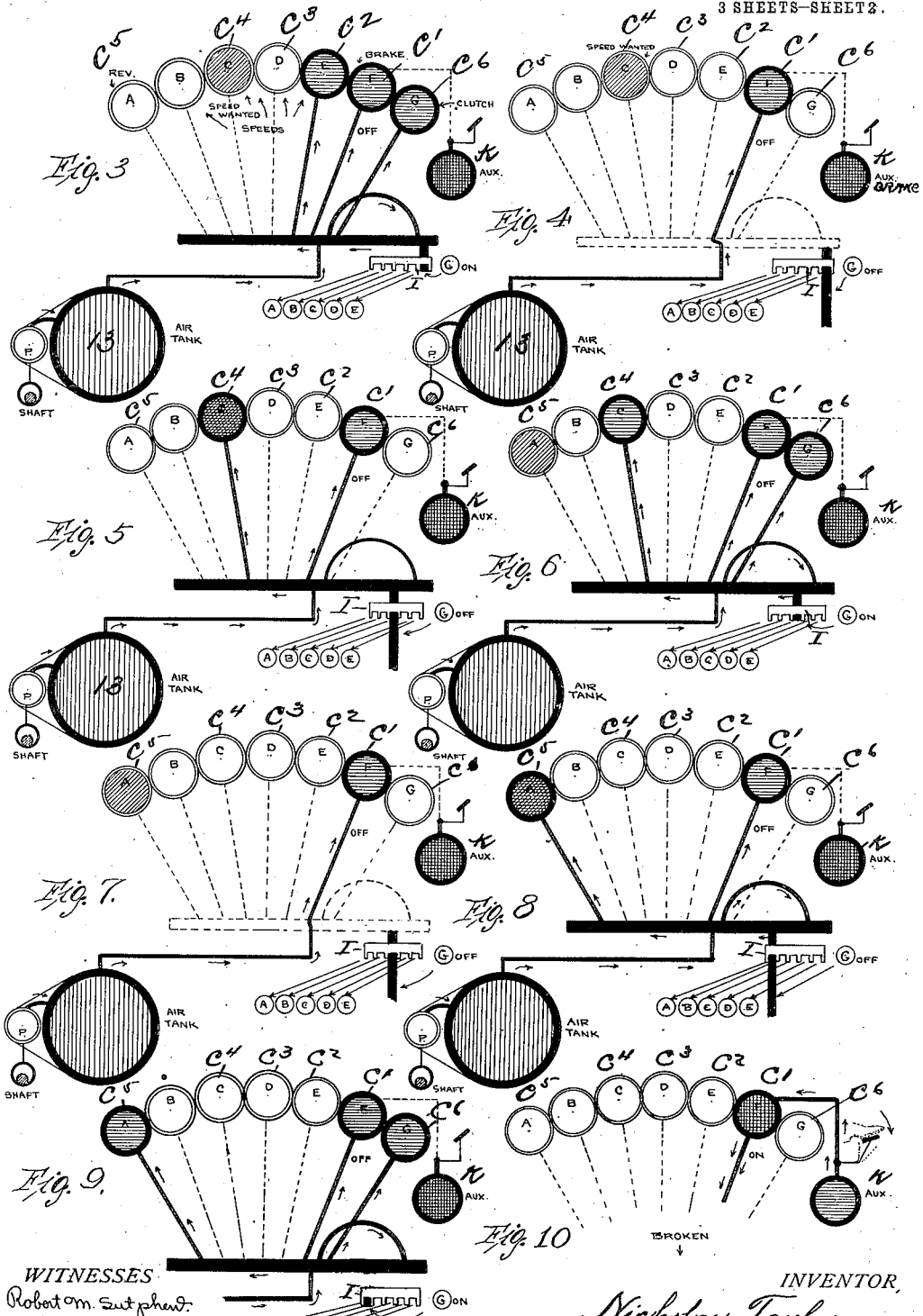

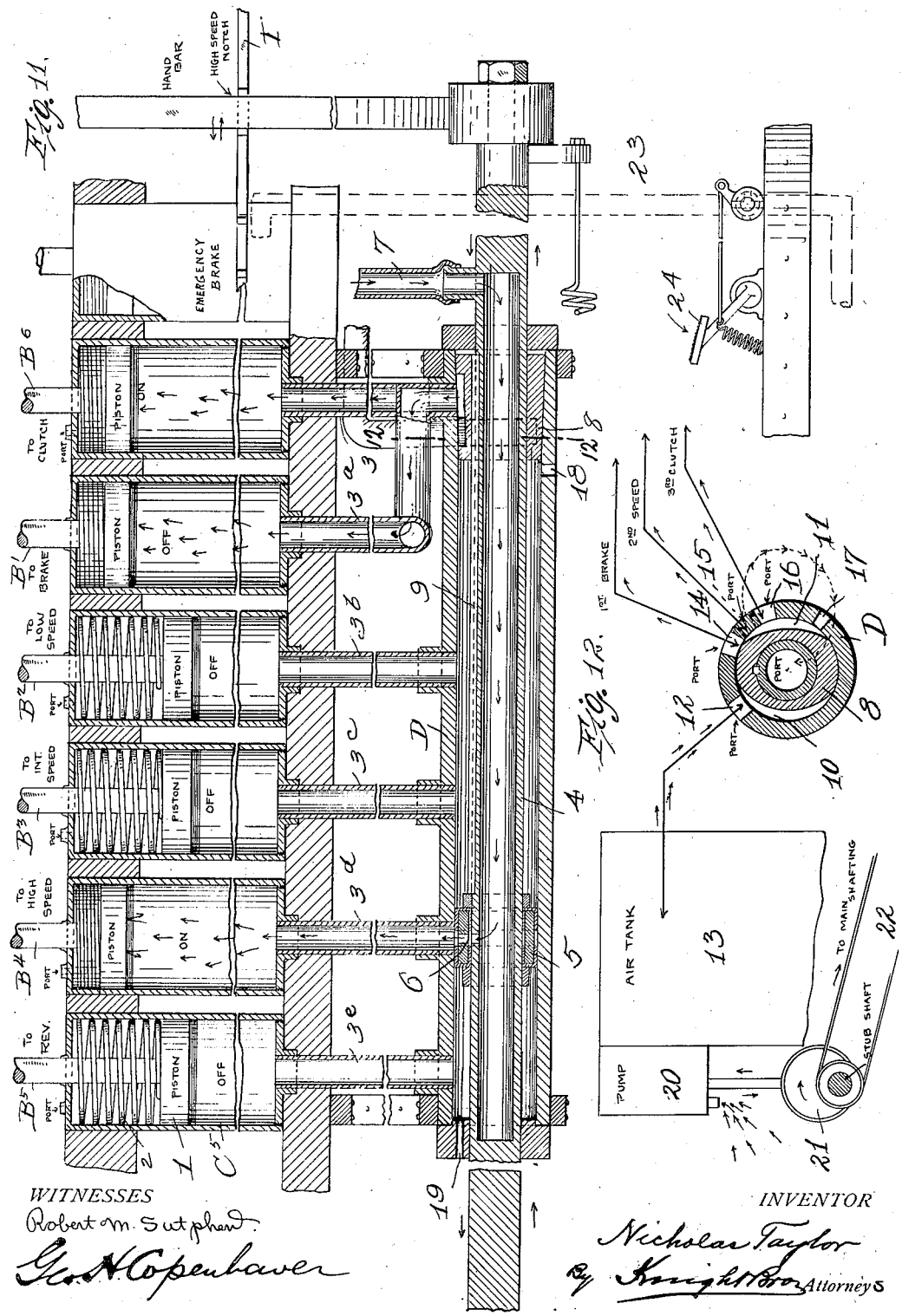

NICHOLAS TAYLOR, OF MUSKOGEE, OKLAHOMA, ASSIGNOR OF ONE-EIGHTH TO FRANK STROUPE, ONE-FIFTH TO GEORGE UPDEGRAFF, AND ONE-EIGHTH TO E. A. EDMONDSON.

CONTROL SYSTEM FOR POWER-TRANSMISSION MECHANISM.

1,102,557. Specification of Letters Patent. Patented July 7, 1914.

Application filed September 14, 1912. Serial No. 720,391.

*To all whom it may concern:*

Be it known that I, NICHOLAS TAYLOR, a citizen of the United States, and a resident of Muskogee, in the county of Muskogee and State of Oklahoma, have invented certain new and useful Improvements in Control Systems for Power-Transmission Mechanism, of which the following is a specification.

This invention relates to a system of control of power from a prime mover, such for instance as an internal combustion engine or other continuously running motor from which power is to be interrupted or the ratio of its transmission modified frequently at will.

One feature of the invention relates to fluid-pressure actuated means whereby a plurality of connections actuating as many different transmitting or driving elements (for instance a plurality of speed gears and a clutch) may be brought under control of a single element (for instance a controlling lever) capable of manipulation to cause introduction selectively of any one of certain of such transmitting elements (for instance the speed gears) at any time and in any order relatively one to another, yet preventing introduction of any one of them except when a master driving element (for instance the clutch) is out of action; and one object of the invention is to exercise the control over the selectively introduced elements, as well as the master element, through means of independently adjustable valves and to render the master valve controlling as to the fluid pressure which is to be delivered through the selecting valve.

Further objects are to provide means, in a system having the characteristics above described, whereby a power opposing element (for instance a brake when the system is used for locomotion) is brought under control of the same manipulating element, but so connected in the system as to prevent its utilization until at least the master driving element has been thrown out; also to permit of at least the master driving element being thrown off or on without disturbing a previously selected gear adjustment, but to always prevent selection of a gear adjustment while the master driving element is in function.

Further objects relate to the embodiment of the several functional characteristics stated in a system in which a fluid pressure medium is utilized to actuate the parts and the controlling element is utilized merely to direct communication of this pressure medium to the respective controlling connections of the several elements; an auxiliary or emergency power opposing element or brake operated by fluid pressure and adapted to be called into effect when the normal braking power fails or is insufficient also, being preferably employed; the brakes being preferably applied automatically in operation as by a spring and released by the distribution of the fluid pressure, so that the brake goes on if the system should fail; and the auxiliary braking force, when utilized, being applied to a separate brake mechanism of greater power or effect.

Further objects relate to the provision of details of construction, whereby a practically successful and conveniently manipulated embodiment of the several features of the invention may be realized.

For purposes of illustration, one embodiment of the invention is illustrated structurally and its functions designated schematically, in the accompanying drawings, in which:—

Figure 1 is a plan view of the chassis of an automobile in which the several features of the invention are embodied; Fig. 2 is a projected diagram of the pressure cylinders introducing the respective elements, and of the pressure-controlling elements therefor; Figs. 3 to 10 inclusive represent schematically the distribution of the fluid pressure medium in each of several phases of transmission, as well as intervening steps leading from one phase to another; the presence of live pressure being indicated by heavy lines and pressure to be next introduced being indicated by cross-hatching; Fig. 11 is a longitudinal section through the pressure controlling element and the several pressure actuated members, and Fig. 12 is a section on the line 12—12, of Fig. 11.

Referring to Fig. 1, A represents the gear case, $B^1$—$B^6$ the controlling rods, $C^1$—$C^6$ the pressure cylinders for said controlling rods, D the valve for distributing fluid pressure to the several cylinders $C^1$—$C^6$, E the engine, F a fluid pressure storage tank, G a pump for keeping the tank supplied, H the valve handle, I a guide rack for the valve handle, preventing its movement longitudinally until it has rotated, K the supply tank of an emergency brake, and L a lever for releasing the auxiliary tank pressure.

As will be understood from Fig. 2, the various longitudinal adjustments of the valve handle H will deliver fluid pressure to either the reverse cylinder $C^6$ or any one of the three speed cylinders $C^4$, $C^3$, $C^2$. Admission of fluid pressure to the clutch cylinder $C^1$ and the brake cylinder $C^5$ is determined by rotary movement of the valve handle H, the clutch being thrown in when the valve handle is in any one of the notches of the rack bar I, and the brake being held off by positive fluid pressure in any position of the valve handle except when it is rotated to extreme position away from the rack bar I. Thus whenever the brake handle H is in one of the notches I and the clutch is thrown on, the handle cannot be moved longitudinally to select a new speed connection, and conversely whenever the handle is thrown out of the rack bar preliminary to moving it longitudinally for selecting a speed, the clutch will be thrown off and the drive of the engine interrupted, so that it will be safe to throw one gear into mesh with another.

The mechanism whereby the above explained functions are adapted to be carried out will be understood upon reference to Figs. 11 and 12, according to which each of the rods $B^1$—$B^6$ has a piston 1 working in the corresponding cylinder $C^1$—$C^6$, with a spring 2 for moving the piston positively in one direction and with the opposite face of the piston exposed to fluid pressure introduced through one of the pipes $3^a$—$3^e$ which are connected up with the valve D.

In each of the speed cylinders, as well as the clutch cylinder, fluid pressure acts in the direction to introduce the element and the spring to throw it out; but in the normal operation of the brake, the spring acts to apply the brake whenever the fluid pressure is cut off and the fluid pressure is introduced to release the brake. In order to deliver fluid pressure to either of the cylinders $B^2$, $B^3$, $B^4$ or $B^5$ at will, the operating handle H is mounted upon an axially sliding tubular rod 4 having a piston 5 fixed thereon and sliding with it in the valve shell D; said piston 5 being provided with a port 6 communicating with the tubular rod and adapted to be brought opposite any one of the tubes $3^b$—$3^e$. The tubular rod 4 communicates through suitable means, for instance a flexible tube 7, with a ground plug valve 8 mounted in the end of the shell D and adapted to be rotated by the tubular rod 4, through means of the sliding key 9, but prevented from moving longitudinally with said rod. The valve 8 is recessed to provide two passageways 10, 11, one on either side, of which the passage 10 is adapted to connect the pressure inlet port 12 leading from tank 13 to the brake port 14, the speed port 15 and the clutch port 16 in the order named. The flexible tube 7 is connected directly with the speed port 15, so that when the valve 8 is rotated, it first communicates pressure to the brake through 14, which releases the brake, then through port 15, tube 7, rod 4 and piston 5, to the particular speed cylinder that has been selected by the longitudinal adjustment of the rod 4, and when the appropriate speed clutch has thus been thrown in, pressure is communicated with the clutch port 16, which throws in the clutch to communicate the rotation of the engine. When it is desired to arrest the drive from the engine, or to change the ratio of transmission, valve 8 is rotated to the left, as viewed in Fig. 12, with the result that an exhaust port 17 in the shell D is connected by the passage 11 with the clutch port 16 to exhaust the air from the clutch cylinder and permit the latter to be thrown out by its spring 2. The valve may be arrested in this position to permit the vehicle to coast. Or while the valve is in this position, the handle H will be out of the rack bar I and may be manipulated to slide the tubular rod 4 endwise to bring the piston 5 opposite any other cylinder tube $3^b$—$3^e$, to change the gearing, after which the handle H may be turned against the rack bar, when the pressure port 12 will again be communicated through the passage 10 with the port 16 to throw in the clutch. By turning the valve 8 a farther distance to the left in Fig. 12, the brake port 14 can be opened to the exhaust 17, with the result that the spring 2 of the brake piston will throw on the brake and retard or stop the vehicle. By turning the valve 8 backward and forward, the air entering the brake piston can be graduated in order to determine the brake pressure at will when it is merely desired to control the vehicle in descending a grade. The speed port 15 is never opened to exhaust port 17, for the reason that it is in a different transverse plane from the ports 14, 16 and 17, and the passageway 11 is restricted in the longitudinal direction, so that it never communicates with the port 15. The speed cylinders are exhausted only when the piston 5 moves away. Until this occurs, the cutting off of the air supplied by rotation of valve 8 merely traps in the previously selected cylinder, a body of air sufficient to hold the gearing in effective position, so that when the clutch is again thrown in, air is not wasted in merely restoring the gear. Exhaust ports 18 and 19 are provided in the shell D for the escape of the air exhausting from the speed cylinders. The air supplied in the tank 13 can be maintained by any suitable means, as for instance by a pump 20 operated by the eccentric 21, which in turn receives power from the engine, as for instance through belt 22.

23 represents a connection between the auxiliary air tank 13 and underside of the piston in the emergency brake cylinder C¹ above which the spring 2 acts and this passage can be controlled by any suitable means, as for instance a foot lever 24, so that in the event of insufficiency of the brake C¹ for an emergency, the auxiliary brake may be called into use.

The several effects produced by the mechanism above described will be more fully understood upon reference to Figs. 3 to 10. In Fig. 3, the brake cylinder C¹, first speed cylinder C² and clutch cylinder C⁶ are all charged with air, so that the brake will be held off, the engine will be driving through the clutch, the ratio of transmission will be that determined by the first speed gear. As indicated by the cross-hatching in the cylinder C⁴ in Fig. 3, it is proposed to next go to the third speed; accordingly, the handle H is rotated to empty the clutch cylinder C⁶, but nor far enough to empty the brake cylinder C¹ (Fig. 4) when the rod 4 is slid lengthwise to empty the first speed cylinder C² and bring the piston 5 (Fig. 11) opposite the third speed cylinder C⁴. The parts will then stand as suggested in Fig. 4. Next the handle is rotated to engage with the rack I, when two conditions will be established, namely, first the condition shown in Fig. 5, with the brake cylinder still under pressure to hold the brake off and the third speed cylinder C⁴ under full pressure to throw its gear into action; then, while maintaining these conditions, the clutch cylinder C⁶ is charged with air, as shown in Fig. 6, and the clutch is thrown in so that the motor drives with the new speed. As suggested by the cross hatching of the reverse cylinder C⁵ in Fig. 6, it is next desired to reverse the engine. First, the handle H is rotated to establish the conditions suggested in Fig. 7 with the brake cylinder C¹ alone under pressure and the piston 5 (Fig. 11) moved away from the cylinder C⁴ which has exhausted that cylinder and opposite the cylinder C⁵, whereupon the handle H will first be rotated until cylinder C⁵ is charged, as suggested in Fig. 8, and then further rotated until the clutch cylinder C⁶ is rotated, as suggested in Fig. 9. In this way, any desired speed may be selected at will, but only after the clutch is thrown off. But in selecting speeds, it is not necessary to select them in any particular order. Moreover, it is not necessary to apply the brake when releasing the clutch, nor necessary to exhaust any speed cylinder by merely releasing the clutch but only when moving the supply piston from one speed cylinder to another.

In case of an emergency, the brake cylinder K will be supplied with pressure directly from the air tank 13, as suggested in Fig. 10.

I claim:—

1. In a system of control for power transmission mechanism; a series of fluid-pressure driven selective actuators, each adapted to control a selective power-transmitting element, an independent fluid-pressure driven master actuator adapted to control a master driving element, a selecting valve adapted to determine the supply of fluid-pressure medium in all of the selective actuators, and a master valve adapted to determine the supply of fluid-pressure medium in the master actuator, and also the flow of fluid-pressure medium through the selecting valve.

2. In a system of control for power transmission mechanism; a series of fluid-pressure driven selective actuators, each adapted to control a selective power-transmitting element, an independent fluid - pressure driven master actuator adapted to control a master driving element, a selecting valve adapted to determine the supply of fluid-pressure medium in all of the selective actuators, and a master valve adapted to determine the supply of fluid-pressure medium in the master actuator, and also the flow of fluid-pressure medium through the selecting valve, and a common manual control-element for both of said valves.

3. In a system of control for power transmission mechanism; a series of fluid-pressure driven selective actuators, each adapted to control a selective power-transmitting element, an independent fluid-pressure driven master actuator adapted to control a master driving element, a selecting valve adapted to determine the supply of fluid-pressure medium in all of the selective actuators, and a master valve adapted to determine the supply of fluid-pressure medium in the master actuator, and also the flow of fluid-pressure medium through the selecting valve, and a common manual control-element for both of said valves having one movement for adjusting the selecting valve and an independent movement for adjusting the master valve.

4. In a system of control for power transmission mechanism; a series of fluid-pressure driven selective actuators, each adapted to control a selective power-transmitting element, an independent - fluid - pressure driven master actuator adapted to control a master driving element, a selecting valve adapted to determine the supply of fluid-pressure medium in all of the selective actuators, and a master valve adapted to determine the supply of fluid-pressure medium in the master actuator, and also the flow of fluid-pressure medium through the selecting valve, a common manual control-element for both of said valves having one movement for adjusting the selecting valve and an independent movement for adjusting the master valve, and a barrier encountered by said manual control element in moving the master valve to throw in the master driving element and preventing said manual control element from moving the selecting valve until after it moves the master valve to throw out the master driving element.

5. In a system of control for power transmission mechanism; a series of selective actuators, each adapted to control a distinct power transmitter, conduits adapted to deliver fluid-pressure medium to each of the selective actuators in the direction to cause it to throw in its power transmitter, a spring for each selective actuator adapted to move it in the direction to throw out its power transmitter, a master actuator adapted to control a master driver, a conduit supplying fluid-pressure medium to the master actuator in the direction to cause it to throw in the master driver, a spring adapted to move said master actuator in the direction to throw out the master driver, a selecting valve controlling the conduits of the selective actuators, and a master valve controlling the conduit of the master actuator.

6. In a system of control for power transmission mechanism; a series of selective actuators, each adapted to control a distinct power transmitter, conduits adapted to deliver fluid-pressure medium to each of the selective actuators in the direction to cause it to throw in its power transmitter, a spring for each selective actuator adapted to move it in the direction to throw out its power transmitter, a master actuator adapted to control a master driver, a conduit supplying fluid-pressure medium to the master actuator in the direction to cause it to throw in the master driver, a spring adapted to move said master actuator in the direction to throw out the master driver, a selecting valve controlling the conduits of the selective actuators, and a master valve controlling the conduit of the master actuator; said valves being independently operable, and said master valve being also adapted to close the supply of fluid-pressure medium to the selecting valve.

7. In a system of control for power transmission mechanism; a series of fluid-pressure driven selective actuators, each adapted to control a distinct power transmitter, conduits adapted to deliver fluid-pressure medium against said actuators in the direction to throw in their transmitters, springs adapted to drive said actuators in the direction to throw out their power transmitters, pressure medium supply and exhaust conduits, a selecting valve adapted to supply and to exhaust the pressure medium to or from any selective actuator, a master actuator adapted to control a master driver and a master governing element for said master actuator; said master governing element being also adapted to open and close the pressure medium supply conduit.

8. In a system of control for power transmission mechanism; a series of fluid-pressure driven selective actuators, each adapted to control a distinct power transmitter, conduits adapted to deliver fluid-pressure medium against said actuators in the direction to throw in their transmitters, springs adapted to drive said actuators in the direction to throw out their power transmitters, pressure medium supply and exhaust conduits, a selecting valve adapted to supply and to exhaust the pressure medium to or from any selective actuator, a fluid-pressure driven master actuator adapted to control a master driver, a fluid-pressure conduit adapted to deliver pressure medium against the master actuator in the direction to throw in the master driver, a spring acting upon the master actuator in the direction to throw out the master driver, and a master valve adapted to close and having ports through which to open communication of fluid-pressure medium both to the master actuator and the supply conduit of the selecting valve.

9. A system of control for power transmitting and brake operating mechanism comprising a plurality of selective actuators, a master actuator, a common controlling member for both selective and master actuators, having one movement to determine the selective actuator to be employed, and another movement to energize the master actuator, a brake releasable by said other movement of the common controlling member, and means for normally throwing on the brake.

10. A system of control for power transmission mechanism comprising a plurality of selective transmitter actuators, and a master driver actuator, individual means for moving the respective transmitter actuators and said driver actuator in the direction to throw them out of action, and a common controlling member controlling both transmitter actuators and master driver actuator, said member operating in the direction to throw them into action; said common controlling member having one movement to determine the selective transmitter actuator to be supplied, and another movement to supply the master driver actuator.

11. A system of control for power transmission mechanism, comprising a plurality of power-driven selective transmitter actuators and a master driver actuator; a power-medium supplying conduit; a distributing means for determining the distribution of power medium from said supplying conduit to the respective actuator of the transmitters; an independent distributing means for delivering power medium to the actuator of the master driver; and a common controlling member for both classes of power-medium distributing-means, having one movement to determine the selective transmitter actuator to be supplied, and another movement to supply the master driver.

12. A system of control for power transmitting and brake operating mechanism; said system comprising a plurality of selectively energized transmitter actuators; a power-medium distributer selectively controlling the supply of power medium to said transmitter actuators; a master driver-actuator; a master power-distributer controlling said driver-actuator; a brake actuator; and connections through which said master distributer controls said brake actuator.

13. A system of control for power transmitting and brake operating mechanism; said system comprising a plurality of selectively energized transmitter actuators; a power-distributer selectively controlling the transmitter-actuators; a master driver actuator; a master power distributer controlling said master driver-actuator; a brake actuator adapted to impart movement in the direction to release a brake; and connections through which said master distributer first supplies energy to release the brake, and then supplies energy to the master-driver actuator.

14. In a system of control for power transmitting and brake operating mechanism, a fluid-pressure controlled master driver-actuator adapted to throw a master driver into driving position; a pressure-medium conduit; a distributing valve adapted to deliver pressure medium from said conduit to the master driver-actuator; a fluid-pressure driven brake-actuator adapted to impart movement in the direction to release a brake; and connections through which said distributer also delivers pressure-medium to said brake actuator.

15. A system of control for power transmitting and brake operating mechanism, a plurality of selectively energized fluid pressure driven transmitter-actuators and a fluid pressure driven master driver-actuator; adapted to move the respective transmitters and the master driver into working position; a pressure medium supply conduit, a selecting distributer adapted to deliver pressure medium to the respective transmitter-actuators; a master distributer adapted to supply pressure-medium to the master-actuator; a pressure-driven brake actuator adapted to throw a brake; and connections through which said master distributer delivers pressure-medium to the brake actuator.

16. In a system of control for power transmitting and brake operating mechanism; a plurality of selectively interposed transmitter actuators, a master driver actuator, and a brake-actuator; each of said transmitter actuators and said driver-actuator having means for normally moving it in one direction to throw its controlled mechanism out of working position, and said brake-actuator having means normally moving it in one direction to throw the brake into braking position; each of said actuators being fluid pressure driven in the opposite direction to throw the respective transmitters and the driver into working position, and the brake out of braking position; a suitable source of pressure-medium supply; a selecting pressure-medium distributer adapted to deliver pressure to either transmitter actuator, and a master pressure distributer adapted to deliver pressure to the actuator of the master driver and also to the brake actuator, and a common manipulating controller adapted to move either of said distributers at will.

17. In a system of control for power transmitting and brake operating mechanism; a plurality of selectively interposed transmitter actuators, a master driver actuator, and a brake-actuator; means for normally moving each of said transmitter actuators and said driver-actuator in one direction to throw their controlled mechanism out of working position, and means for normally moving said brake actuator in one direction to throw the brake into braking position; each of said actuators being fluid pressure driven in the opposite direction to throw the respective transmitters and the driver into working position, and the brake out of braking position; a suitable source of pressure-medium supply; a selecting pressure-medium distributer adapted to deliver pressure to either transmitter actuator, and a master pressure distributer adapted to deliver pressure to the actuator of the master driver and also to the brake actuator, and a common manipulating controller adapted to move either of said distributers at will; said master distributer being also adapted to control the supply of pressure medium to said selecting distributer.

18. In a system of power transmission, the combination of a plurality of selective fluid-pressure actuated pistons for controlling the introduction of transmission gears, a master-clutch piston through which a master clutch may be thrown into action, a source of pressure-fluid and a valve device moving in one direction to selectively deliver pressure fluid to the transmission-gear pistons, and moving in another direction to deliver pressure-fluid to the master-piston.

19. In a system of power transmission, the combination of a plurality of driving-gear pistons for selectively introducing different gears, a clutch-piston for throwing a clutch into action, and a common valve device serving both kinds of pistons comprising a sliding member through which pressure fluid is delivered, movable into communication with either of the driving gear pistons, and a rotating member rotatable into and out of communication with the clutch-piston.

20. In a system of power transmission, the combination of a plurality of driving-gear pistons for selectively introducing different gears, a clutch-piston for throwing a clutch into action, a common valve device serving both kinds of pistons comprising a sliding member through which pressure fluid is delivered, movable into communication with either of the driving gear pistons, and a rotating member rotatable into and out of communication with the clutch piston, and a common controlling member for said sliding and rotating members adapted to impart movement to either without moving the other.

21. In a system of power transmission, the combination of a plurality of driving-gear pistons for throwing different gears into action, a clutch-piston for throwing a clutch into action, a common valve device serving both kinds of pistons comprising a sliding member through which pressure fluid is delivered, movable into communication with either of the driving-gear pistons, and a rotating member rotatable into and out of communication with the clutch-piston, and a common controlling member for said sliding and rotating members adapted to impart movement to either without moving the other; said common controlling member comprising a rod fixed longitudinally with relation to the sliding member, but movable longitudinally and fixed in rotary direction relative to the rotating member.

22. In a system of power transmission, the combination of a plurality of driving-gear pistons for throwing different gears into action, a clutch-piston for throwing a clutch into action, a common valve device comprising a sliding member through which pressure fluid is delivered, movable into communication with either of the driving-gear pistons, and a rotating member rotatable into and out of communication with the clutch-piston, and a common controlling member for said sliding and rotating members adapted to impart movement to either without moving the other; said common controlling member comprising a rod fixed longitudinally with relation to the sliding member, but movable longitudinally and fixed in rotary direction relatively to the rotating member; said rod being constructed with a pressure fluid bore formed therein, having communiaction with a source of pressure fluid, and also in communication with the sliding member.

23. In a system of power transmission, the combination of a plurality of selective fluid-pressure controlled gear-setting pistons, a housing in communication with each of said gear-setting pistons, a pressure fluid distributer movable in said housing into communication with any of said gear setting pistons at will, a clutch-piston for actuating a clutch, a valve controlling the delivery of pressure fluid to the clutch-piston, a housing for said valve, and ports in the valve housing communicating, respectively, with a source of pressure fluid with the clutch-piston, and with the pressure fluid distributer, said ports being controlled by said valve.

24. In a system of power transmission, the combination of a plurality of selective fluid-pressure controlled gear-setting pistons, a housing in communication with each of said pistons, a pressure fluid distributer movable in said housing into communication with any of said pistons at will, a clutch-piston, a valve controlling the delivery of fluid pressure to the clutch-piston, a housing for said valve, and ports in the valve-housing controlled by said valve, and communicating, respectively, with a source of fluid pressure, with the clutch-piston, and with the pressure-distributer, and located so that pressure fluid is communicated first to the pressure distributer and then to the clutch piston upon the movement of said valve.

25. In a system of power transmitting and brake operating mechanism, the combination of a plurality of selective fluid-pressure controlled gear setting pistons, a housing in communication with each of said gear-setting pistons, a pressure fluid distributer movable in said housing to bring it into communication with any of said pistons at will, a clutch-piston, a valve controlling the delivery of pressure fluid to the clutch-piston, a housing for said valve, ports in the valve-housing controlled by said valve and communicating, respectively, with a source of pressure fluid with the clutch piston, and with the pressure fluid distributer; and a brake controlling fluid-pressure driven piston; and said valve housing also having a port through which to deliver pressure fluid to said brake piston.

26. In a system of power transmitting and brake operating mechanism, the combination of a plurality of selective fluid-pressure controlled gear setting pistons, a housing in communication with each of said gear-setting pistons, a pressure fluid distributer movable in said housing to bring it into communication with any of said pistons at will, a clutch-piston, a valve controlling the delivery of pressure fluid to the clutch-piston, a housing for said valve, ports in the valve-housing controlled by said valve and communicating, respectively, with a source of pressure fluid with the clutch piston, and with the pressure fluid distributer; and a brake controlling fluid-pressure driven piston; and said valve housing also having a port through which to deliver pressure fluid to said brake piston, said ports in said valve housing being located to deliver the fluid pressure, first to the brake-controlling piston, then to the pressure distributer, and finally to the clutch-piston upon movement of said valve.

27. In a system of power transmission, the combination of a plurality of selective gear setting pistons, a housing in communication with each of said gear setting pistons, a pressure fluid distributer movable in said housing to bring it into communication with any of said gear setting pistons at will, a clutch-piston, a valve controlling the delivery of pressure fluid to the clutch-piston, a housing for said valve, and ports in the valve housing controlled by said valve and communicating, respectively, with a source of pressure fluid, with the clutch piston, and with the pressure fluid distributer; said ports being located so that pressure fluid is communicated first to the pressure distributer and then to the clutch upon movement of said valve; said valve-housing also having an exhaust port and said valve being adapted to shut off the flow of pressure fluid and to communicate the clutch-piston with the exhaust port without opening communication between said exhaust port and the pressure fluid distributer.

28. In a system of power transmitting and brake operating mechanism, the combination of a plurality of selective fluid-pressure controlled gear-setting pistons, a housing in communication with each of said pistons, a pressure fluid distributer movable in said housing to bring it into communication with any of said pistons at will, a clutch-piston, a valve controlling the delivery of pressure fluid to the clutch-piston, a housing for said valve, ports in the valve-housing controlled by said valve and communicating, respectively, with a source of pressure fluid, with the clutch-piston, and with the pressure fluid distributer, a brake controlling pressure fluid piston, a port in said valve-housing adapted to deliver pressure fluid to said brake-piston; said valve-housing ports being located to deliver the pressure fluid, first to the brake-piston, then to the pressure fluid distributer, and finally to the clutch-piston upon movement of said valve, an exhaust-port in said valve-housing, and said valve being adapted to shut off the flow of pressure fluid and to communicate said exhaust-port with the clutch-piston, and also with the brake-piston without releasing pressure from the pressure distributer.

The foregoing specification signed at Washington, District of Columbia, this 14th day of September, 1912.

NICHOLAS TAYLOR.

In presence of two witnesses:
   HERVEY S. KNIGHT,
   EDWIN S. CLARKSON.